United States Patent

[11] 3,585,394

[72] Inventors Richard F. Higby
Severna Park;
Edgar L. Irwin, Glen Burnie, both of, Md.

[21] Appl. No. 803,559
[22] Filed Mar. 3, 1969
[45] Patented June 15, 1971
[73] Assignee Westinghouse Electric
Pittsburgh, Pa.

[54] IMAGE CONVERTER HAVING A TIME VARYING BIAS CONTROL
10 Claims, 6 Drawing Figs.

[52] U.S. Cl. .......... 250/213, 250/83.3, 250/220
[51] Int. Cl. .......... H01j 31/50, H01j 39/12
[50] Field of Search .......... 250/213, 211 J, 213 A, 220 MX, 83.3 IDI, 80

[56] References Cited

UNITED STATES PATENTS

| | | | |
|---|---|---|---|
| 3,131,305 | 4/1964 | Shombert | 250/211 JX |
| 3,143,682 | 8/1964 | Clarke et al. | 250/80 X |
| 3,466,441 | 9/1969 | Batdorf et al. | 250/213 X |
| 3,473,032 | 10/1969 | Levehoc | 250/211 J |
| 3,480,830 | 11/1969 | Horton et al. | 250/211 J |

*Primary Examiner*—James W. Lawrence
*Assistant Examiner*—C. M. Leedom
*Attorneys*—F. H. Henson, E. P. Klipfel and J. L. Wiegreffe

ABSTRACT: An image converter for converting infrared images to visible images. A four-layer semiconductor sensitive to infrared radiation functions as a switch. The conductive state of the switch controls the radiation from a visible light-emitting element. A threshold bias with increases with time, is applied to the four-layer semiconductor between periodic blanking signals.

IMAGE CONVERTER HAVING A TIME VARYING BIAS CONTROL

This invention relates to a low-light level solid-state image converter for converting an image in the infrared region to an image in the visible region. It is sometimes desirable to transmit infrared radiation and thence to convert a reflected image formed therefrom into visible radiation, as for example, in sniper rifle scopes. Other occasions arise as for example in medicine where or separate or distinct infrared source is required. Here it is often possible to determine the presence, location and outline of portions of the skin which are at slightly higher temperatures and which thereby suggest the presence of subjacent tumors. Utility of the invention is further displayed in geophysical explorations such as infrared mapping wherein portions of the earth have been found to be somewhat warmer than nearby or somewhat adjacent portions. Such information aside from its inherent interest is sometimes employed in surveying, mining and earthquake predictions.

In general, infrared radiation is that band of electromagnetic radiation arbitrarily denominated as having wavelengths between $7\times10^3$A and $10^7$A. Visible light is generally defined as that band having wavelengths from $4\times10^3$A to $7\times10^3$A.

The present invention utilizes a known effect of infrared radiation on certain solid-state or semiconductor devices. Electromagnetic energy irradiating a semiconductor device can alter the electron distribution of the device's various energy bands. In the invention a four-layer semiconductor is employed as a normally open switch which changes its state of conduction upon exposure to infrared light. Another semiconductor device, here of the diode or two-layer type, is employed for emitting visible radiation when energized. The diode's energization depends upon the state of conduction of the four-layer device. By this switch-emitter action, infrared light is effectively or virtually transformed into visible light. Considering an infrared image as defined by a plurality of point sources each of which controls a separate switch-emitter action, the invention thus converts images from one wavelength to another.

The invention employs a sensor mosaic surface fabricated of four-layer semiconductor devices. A second mosaic is contiguous to the first mosaic and is termed an emitter mosaic. By means of the well-known flip chip process, the conduction state of each of the sensor switches controls its corresponding diode emitter. The invention further comprehends the physiological behavior of the eye by utilizing its logarithmic response to yield gradation (tone) in the visible image.

Figure 4A:
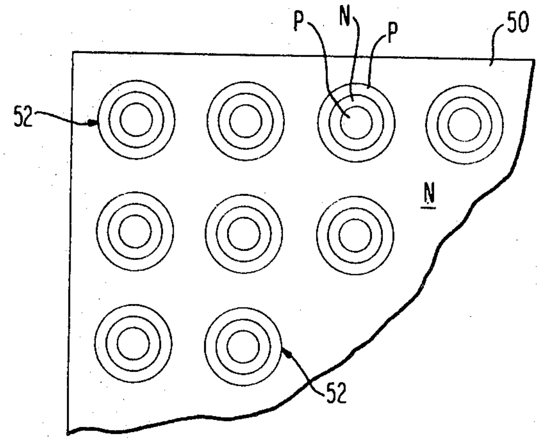

FIG. 4*a* is a top view of a sensor mosaic formed in accordance with this invention.

Figure 4B:
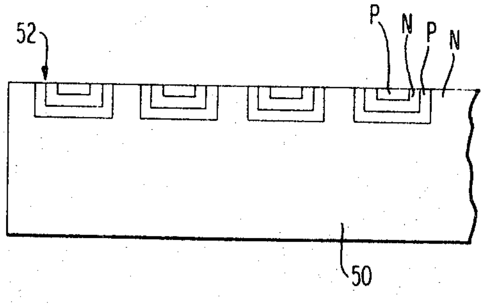

FIG. 4*b* is a typical cross section of the mosaic of FIG. 4*a*.

Figure 5:
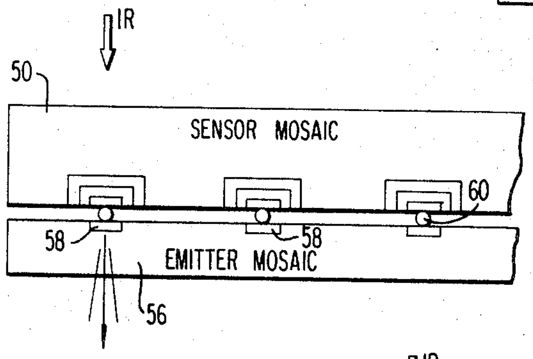

FIG. 5 is a schematic cross-sectional view of the complete and composite mosaic, including the emitter mosaic, formed according to the invention.

Figure 6:
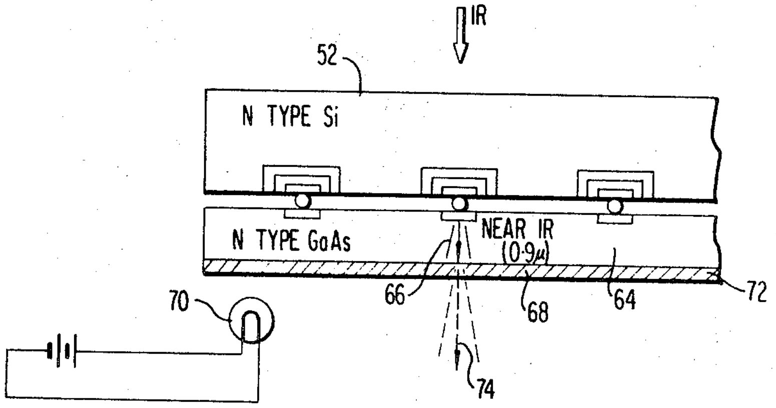

FIG. 6 is a view similar to FIG. 5 and shows a modification.

Figure 1:
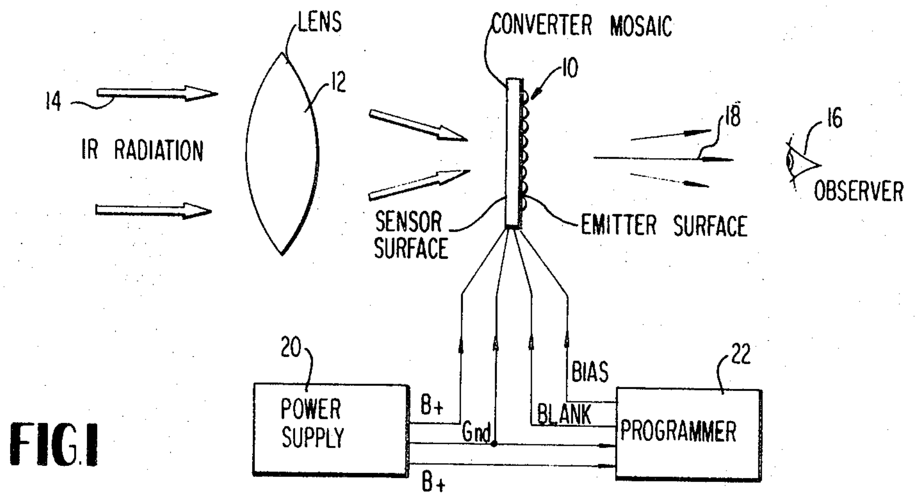
FIG. 1 is a schematic representation of a solid-state image converter according to this invention.

Referring now to FIG. 1 of the drawings, the numeral 10 denotes generally a composite image converter mosaic formed in accordance with this invention. The numeral 12 denotes an optical system for focusing infrared radiation dented by the numeral 14 onto one face of the converter mosaic 10. The numeral 16 denotes an observer viewing visible light 18 emitted from the opposite side or face of the converter mosaic, it being understood that the eye 16 may assume instead the form of a a photographic plate of film. The numeral 20 denotes a power supply and the numeral 22 denotes a programmer device. The programmer device supplies periodic threshold bias signals to various four-layer devices to be described and also generates periodic blanking signals. The internal circuitry of the programmer 22 may assume any of a great variety of forms since it is well known to workers in this art how to conjure internal circuitry to perform the functions later to be described.

Figure 2:
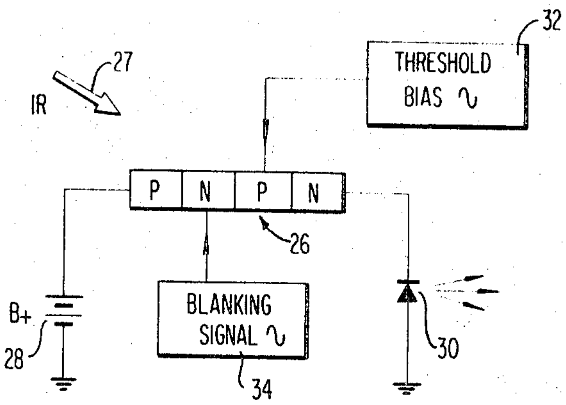
FIG. 2 is a partially schematic view of a four-layer semiconductor device which functions as a switch in combination with a diode emitter of visible light.

Referring now to FIG. 2 of the drawings, the numeral 26 denotes generally a known four-layer semiconductor device doped as indicated. A power supply 28 is provided at one terminal and the remote terminal is connected to a visible light-emitting diode 30, coupled as indicated in the circuit. The numeral 32 denotes a threshold bias and generator applied to the third layer of the device, and the numeral 34 denotes a blanking signal and generator applied to the second layer, or as indicated.

Figure 3:
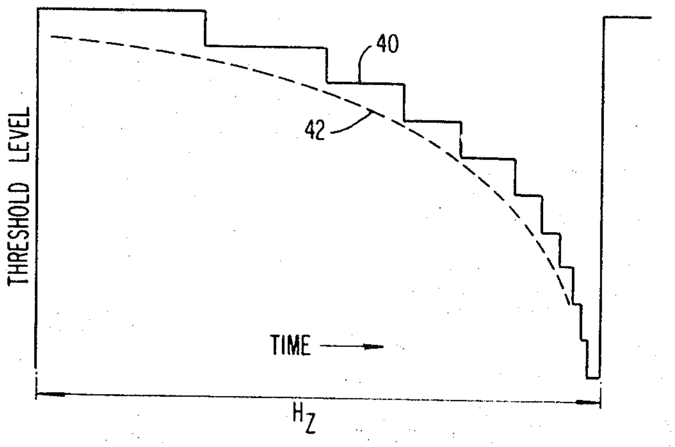
FIG. 3 is a representation of the periodic threshold potential applied to one of the layers of the switch of FIG. 2.

Referring now to FIG. 3 of the drawings, the numeral 40 denotes the shape of the threshold bias signals applied and which assume the form of a staircase or stepped curve periodically applied, as indicated at 32 in FIG. 2 of the drawings. The curve denoted by the dashed line 42 in FIG. 3 represents the natural or physiological logarithmic response function of the eye. For the illustrated curve, and as will be more fully understood from later explanation, the particular staircase curve 40 would yield 10 gradations of visible light.

FIGS. 4*a* and 4*b* illustrate one form of a sensor mosaic of the invention. The numeral 50 denotes a substrate of an N-type semiconductive material into which zones of alternate impurity-type doped portions are placed. As illustrated at FIGS. 4*a* and 4*b* each four-layer device or switch 52 is defined by dish zones. Referring now to FIG. 5 of the drawings, the generally planar switch mosaic is located contiguous to an emitter mosaic having a main N substrate 56 and a plurality of impurity zones of P-type material 58. The numeral 60 denotes any one of a plurality of raised flip chip contacts contiguous to the inner P zone of each four-layer device 52 and the P-type 58 of the emitters. It will be understood that semiconductor types 58 and 56 cooperate pairwise to define a diode for the emission of visible light.

Referring again to FIG. 2 of the drawings, the reader will regard the element 26 as an electrical switch having an off-conduction state and an on-conduction state. Further, the switch 26 is actuable by light of a first wavelength, as by infrared light. Disregarding for the moment the elements 32 and 34, it will be recalled that the irradiation of the switch 26 by infrared light will change the conductive state from off to on. It will be further recalled that the radiant energy level of the incident radiation at which the conductive state changes may be varied by changing a bias applied to the switch. By applying a forward bias to the third layer the radiant energy level required for actuation of the switch may be reduced. It will still further be recalled that after changing its conductive state from off to on, the switch 26 will remain on until a reverse bias is applied to one of the layers or electrodes. In the case illustrated, such a reverse bias is termed a blanking signal and is applied as indicated at 34.

The operation of the entire device is as follows: At the beginning of a cycle each switch 52 (26) assumes an off conduction state and in this state each corresponding diode is quiescent, i.e., the diodes do not emit any visible light. With infrared radiation falling upon the sensor mosaic 50, the threshold bias 32 is applied and the threshold level of irradiance required to cause each sensor to change its state is sequentially decreased, as indicated by the curve 40. It will be recalled that curve 40 approximates the natural logarithmic response of the human eye. By virtue of these gradations, each corresponding emitter is turned on for a time period proportional to the intensity as well as the duration of the infrared radiation impinging upon the sensors. The eye 16 of the observer integrates the light from the emitter mosaic over the time intervals that the respective diode devices are energized. The result of the integration is a sensation experienced by the observer of seeing a visual image with as many total gradations of contrast as there are discrete increments of on-conduction time. At the end of each of the staircase cycles illustrated at FIG. 3 of the drawings, the programming device 32 applies a blanking signal as indicated at 34 in FIG. 2 and this causes all of the switches 52 (26) to revert to their off-conduction state. This in turn extinguishes all of the visible light emitting devices. Now the staircase cycle is repeated by the programming device 22, each cycle being applied in synchronism to each sensor switch.

The cycle time or period must be shorter than the integration time of the human eye, the latter normally taken as approximately 0.2 seconds. A rate of 30 per second, being the same as the standard television frame rate, is a suitable cycle rate. The amplitude of each of the threshold steps in the curve 40 is adjusted to be equal to or exceed the liminal sensitivity of the sensors 52. The width of the steps is progressively adjusted so that the integration times corresponding to the different threshold levels satisfy the logarithmic response of the eye. In practice, the present state of technology is capable of forming a mosaic such as that illustrated at FIGS. *4a* and *4b* with approximately 100 elements 52 per inch with a switch sensitivity less than $10^{16}$ foot candles.

The emitter mosaic 56 may be formed of several different materials capable of emitting radiation when forward biased. As an example, gallium phosphide (GaP) may be employed. An alternate arrangement is illustrated at FIG. 6 of the drawings wherein the corresponding emitter mosaic 64 (56 of FIG. 5) is formed of N-type gallium arsenide (GaAs). In this case, the light 66 emitted by the various emitters is in the near infrared and of a wave length approximately 0.9 microns.

The numeral 70 denotes a source of ultraviolet light which illuminates a phosphor layer 72 on the emitter mosaic 64. The infrared radiation 66 impinging on the phosphor layer 72 energizes it and causes the emission of visible light denoted by the numeral 74. While the embodiment of FIG. 6 is more complex than the previously described embodiment, the cost is a fraction of the cost of a gallium phosphide mosaic.

While the practice of the invention will admit of various specific dimensions and parameters, the following have been found satisfactory. The sensor elements 52 are diffused and have a thickness range of 10—15 microns, with the thickness of the mosaic substrate 50 being 0.004—0.005 inches. The emitter elements are also diffused and are of a depth of 5—10 microns, with the thickness of the mosaic substrate 56 being 0.005—0.007 inches. The phosphor layer 72 is 50—100 microns in thickness.

What we claim is:

1. A method of converting light images of a first wavelength to light images of a second wavelength, including the steps of, a. irradiating a switch actuable by light of a first wavelength with such light, b. applying to said switch a bias signal which increases with time to thereby vary the threshold at which said switch will be actuated by the irradiating light of the first wavelength, to thereby change its conductive state, c. controlling the energization of a light-emitting element by the conductive state of said switch, said element emitting light of a second wavelength when energized, d. whereby the duration of the light emitted from the emitting element is proportional to the intensity as well as the duration of the irradiation of the switch.

2. The method of claim 1, including the additional steps of, a. periodically applying a blanking signal to said switch, to thereby cause it to periodically revert to its original conductive state, and b. periodically applying said bias signal to said switch in the time interval between said blanking signals.

3. The method of claim 2 wherein said bias signal increases at least approximately logarithmically.

4. The method of claim 3 wherein said bias signal diminishes the threshold level at which said switch will be actuated.

5. An apparatus for converting light of a first wavelength to light of a second wavelength, said apparatus including, a. a plurality of light-sensitive switches, b. each of said switches having a first conductive state when not irradiated by energy of a first wavelength and having a second conductive state when irradiated by such energy, the conductive threshold of said switches being a function of a bias signal applied thereto which varies approximately logarithmically, c. a plurality of light-emitting elements having a one-to-one relationship with the said switches, the light emitted being of a second wavelength and varying at least approximately exponentially with time, the energization state of each of said light-emitting elements being dependent on the conductive state of its corresponding switch, d. means for periodically applying a blanking signal to said switches to cause them to revert to their first conductive state.

6. The apparatus of claim 5 including, a. means for periodically applying said bias signal to said switches in the time interval between said blanking signals.

7. Apparatus for converting light images of a first wavelength to light images of a second wavelength comprising, a. switch means responsive to light wave energy of said first wavelength, b. means for applying a biasing voltage which increases with time to thereby vary the threshold at which said switch will be actuated by irradiating light of said first wavelength, c. light-emitting means responsive to a signal voltage to produce light of a second wavelength, whereby the duration of the light emitted from said emitting element is proportional to the intensity as well as the duration of the irradiation of said switch.

8. The combination as set forth in claim 7 in combination with means for periodically applying a blanking signal to said switch to thereby cause it to periodically revert to its original conductive state and means for periodically applying said bias signal to said switch in the time interval between said blanking signals.

9. The combination as set forth in claim 7 in which said biasing signal increases approximately logarithmically.

10. The combination as set forth in claim 7 in which said switch is a four layer semiconductor device mounted in a mosaic and said emitters are each diode semiconductor devices mounted in a mosaic.